(12) United States Patent
Broster et al.

(10) Patent No.: US 6,424,968 B1
(45) Date of Patent: Jul. 23, 2002

(54) INFORMATION MANAGEMENT SYSTEM

(75) Inventors: Ian Broster, Market Rasen; Michael Worsley, Freckleton; Duncan Maidment, Coggeshall; Dipak Patel, Wolverhampton; Paul Clough, Woodbridge; Garry Casson; Alan John King, both of Ipswich, all of (GB)

(73) Assignee: British Telecommunications public limited company, London (GB)

( * ) Notice: Subject to any disclaimer, the term of this patent is extended or adjusted under 35 U.S.C. 154(b) by 60 days.

(21) Appl. No.: 09/194,188

(22) PCT Filed: Oct. 15, 1998

(86) PCT No.: PCT/GB98/03101

§ 371 (c)(1),
(2), (4) Date: Nov. 24, 1998

(87) PCT Pub. No.: WO99/21108

PCT Pub. Date: Apr. 29, 1999

(30) Foreign Application Priority Data

Oct. 21, 1997 (EP) ............................................. 97308360

(51) Int. Cl.$^7$ .............................................. G06F 17/30
(52) U.S. Cl. ................................ 707/3; 707/1; 707/10; 707/101; 707/102; 707/104; 709/203; 709/217; 709/229
(58) Field of Search ............................... 707/1, 2, 3, 4, 707/5, 10, 101, 102, 104, 9; 709/201, 203, 204, 217, 229

(56) References Cited

U.S. PATENT DOCUMENTS

| | | | | |
|---|---|---|---|---|
| 5,263,167 A | * | 11/1993 | Conner, Jr. et al. | 395/700 |
| 5,724,571 A | * | 3/1998 | Woods | 395/605 |
| 5,761,662 A | * | 6/1998 | Dasan | 707/10 |
| 5,931,907 A | * | 8/1999 | DAvies et al. | 709/218 |
| 5,978,799 A | * | 11/1999 | Hirsch | 707/4 |
| 6,115,040 A | * | 9/2000 | Bladow et al. | 345/335 |

\* cited by examiner

*Primary Examiner*—Thomas Black
*Assistant Examiner*—Jacques Veillard
(74) *Attorney, Agent, or Firm*—Nixon & Vanderhye

(57) ABSTRACT

An information management system is provided including a database and one or more data retrieval tools, a data retrieval tool being arranged to retrieve information according to registered interests of users of the system and to store data in the database relating to the information retrieved. User interests may be stored in the database as user profiles comprising one or more keywords. In addition, projects may be defined, each project having a profile stored within the system. A user interface enables a user to enter user and project profile or other information, and a data input tool is provided to generate from the user input one or more data sets for storage as profiles in the database, Control means are provided to take user input, submit it to the data input tool and to supply data sets generated and stored thereby to the data retrieval tool for use in searching and locating relevant information. A user may also manually select, from output by a data retrieval tool, information for persistent storage in relation to the user's profile or in relation to one or more projects to which the user has appropriate access. The control means may be arranged to control access by users to view or modify projects and to share associated information.

9 Claims, 2 Drawing Sheets

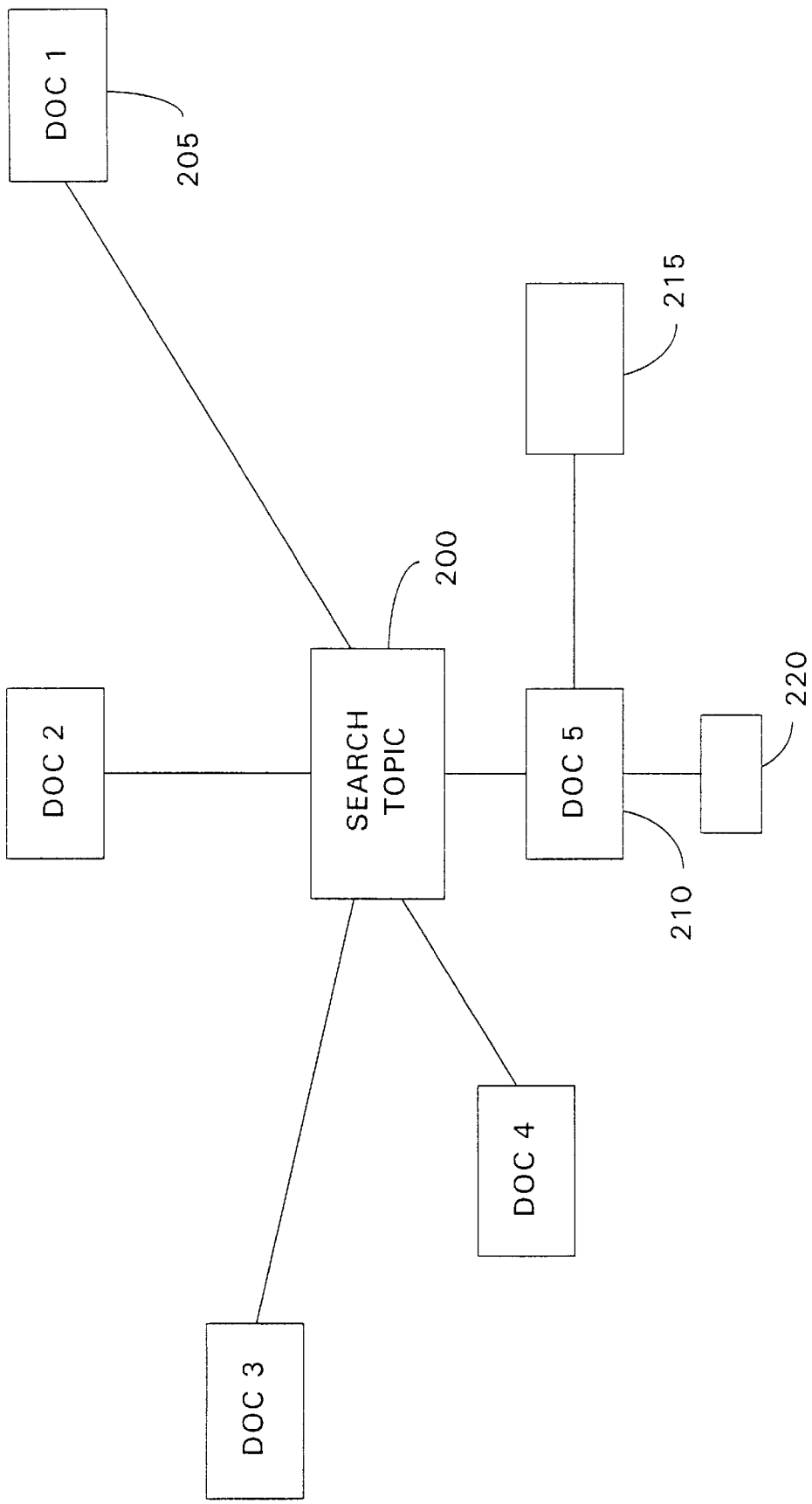

INFORMATION MANAGEMENT SYSTEM

BACKGROUND OF THE INVENTION

The present invention relates to information management systems.

Information management nowadays can be a complex problem. There is a large amount of information available from many sources. For instance, in a corporate environment there may be in-house databases and shared word processing environments, and the user may have access to an information network such as the Internet.

The Internet is a known communications system based on a plurality of separate communications networks distributed across several countries but connected together. It provides a rich source of information from many different providers but this very richness creates a problem in accessing specific information as there is no central monitoring and control.

Software agents provide a known approach to dealing with information management. Each agent generally comprises functionality to perform a task or tasks on behalf of an entity (human or machine-based) in an autonomous manner, together with local data, or means to access data, to support the task or tasks. For instance, an information agent might select documents of relevance to a topic or user. It would therefore need access to the documents, processing functionality to select the relevant documents, and data to enable the selection to take place.

Different types of agent-based systems are described in several published papers, such as those published in the proceedings of the First and Second International Conferences on the Practical Application of Intelligent Agents and Multi-Agent Technology. These are published by the Practical Application Company Ltd., Blackpool, Lancashire, in 1996 and 1997 respectively. A general comprehensive review of agent-based technology is given by Hyacinth S. Nwana, "Software Agents: An Overview" in the *Knowledge Engineering Review journal*, Vol. 11, No. 3, pages 205–244.

In co-pending international Patent Application Number WO96/23265, there is described a software agent particularly for use in information management. The agent, known as "JASPER", is associated with a user's Internet browser and alerts the user to documents of interest to them. To do that, JASPER uses a keyword set for the user concerned. However, by using clustering techniques, JASPER can extend the keyword set to pick up documents that would not have been located otherwise.

There are also tools known for processing the information itself, such as the PROSUM information summariser described in the applicant's co-pending European patent application number 97302616.4. This summarises information in accordance with a user's particular interest rather than simply in accordance with the content of the document. Hence a user looking at the results of a search and reading the summary produced by PROSUM will be alerted to a document in which the user's interest is represented by only a reference within the document, the document being principally about something else. Such documents tend not to be picked up by more conventional search tools.

SUMMARY OF THE INVENTION

According to embodiments of the present invention, there is provided an information management system for a plurality of users, the system comprising:

i) at least one user interface for receiving user input information;

ii) data storage means;

iii) a data input tool for generating a data set from user input information received at the interface, and for storing the data set in the data storage means;

iv) means for generating and storing user profiles, each user profile comprising at least one keyword allocated to a respective user;

v) at least one data retrieval tool for locating information in accordance with each of a plurality of user profiles, for storing data relating to information so located, and for searching data so stored in accordance with at least one data set generated by the data input tool; and vi) control means for receiving said user inputs and for running one or more of said tools wherein the control means is adapted, in use, to receive said user input information, to run the data input tool to generate and store said data set from the input information, and to input said data set to the data retrieval tool to search said data so stored.

"Information" in this context means any information whether presented in words, images or computer code for instance, and would include a computer file or a computer program, Internet pages, electronic mail documents, text files, word-processed documents, or multimedia objects such as movie, picture or sound files.

A "user" might well be another piece of equipment. A user is not necessarily a human entity in the context of this specification.

In general, a data set generated by the user input tool comprises a data set which characterises the information but is relatively a much smaller data set than the information itself. Hence a data set may comprise an identifier and a set of keywords, or it may comprise additional information such as creation and download dates, authorship and even an abstract or summary.

Embodiments of the present invention offer a particularly useful information management environment for a plurality of users who might be interested in similar topics. Preferably, the control means further comprises means to log user identity information against a data set generated from information input by that user. This enables the control means to exercise access and modification controls between that user and other users.

Embodiments of the present invention can provide an extremely useful data storage and management environment for a plurality of users. For instance, in a corporate environment, the data set generated by the data input tool may characterise a project and may be stored as a profile for the project. The control means may be adapted to give access to the data set, and/or associated information, only to the user providing the user input information. This might be done for instance by registering an identifier for that user against an identifier for the data set, or by adding the identifier for the user to the data set itself. Such a user might be called an owner in relation to that data set. Alternatively, the control means may give access to additional users, but not the capability to modify the data set and/or associated information.

Preferably, the control means further provides management capability for the user recorded as owner in that the control means may maintain a register of identifiers for other users having access in respect of the data set, the owner having unique control over the contents of the register.

Preferably, the system further comprises user selection means, for selecting results output by the data retrieval tool, the selected results being persistently stored. The results may be persistently stored in relation to the relevant user, and/or may be persistently stored in relation to the data set used by the data retrieval tool to locate the results. This introduces the concept of a "virtual case file". Results selected for persistent storage, for instance providing closely relevant background information to the data set, may even be user specific so that one user retrieving the virtual case file in relation to the data set will be provided with a different set of stored results from that provided to another user in relation to the same data set.

Preferably, the way in which the data retrieval tool reports data it finds by searching includes a measure of the relevance of each piece of data to the data set used in the search. This is of great use in the complex information environment of today in which it may not be practical to review much more than a very small proportion of information available, in a direct way by the user. The measure of association can be applied in a discrete rather than a continuous way. For instance, it might be used to separate search results into two or more layers, the first layer being strongly relevant to a request and the second layer being weakly relevant to the request. The user can preferably select how many layers are to be reported in response to a request. This is in contrast with known search engines which report a fixed number of search results rather than all the results to a certain level of relevance.

A capability reserved for users recorded as owners is the assignment of other users to a data set. The data set may represent a project. Each project may have a set of users assigned to it. This can provide a management facility in that, when a project is completed, the project owner can flag the completion to the system. The system then deletes the list of assigned user identifiers. The project data set, or profile, can then be reactivated at a later date or simply deleted from the system by the owner.

Preferably, a system according to an embodiment of the present invention can provide a transparent interface to a plurality of search, retrieval and/or analysis tools, the user being able to use the system without having to select and operate the different tools. This can be done by giving the system processing capability such that it can analyse a requirement in context and select a tool appropriately.

It should be noted that the data storage means of embodiments of the present invention may comprise a single database or a plurality of databases. For instance, one or more search, retrieval and/or analysis tools may be provided with its own database, in addition to there being a system database. The (or any) database may of course also be distributed or centralised.

BRIEF DESCRIPTION OF THE DRAWINGS

Embodiments of the invention will now be described, by way of example only, with reference to the following drawings of which:

FIG. 2 is a diagram illustrating a typical visualisation of information relationships.

DETAILED DESCRIPTION OF THE INVENTION

Figure 1:
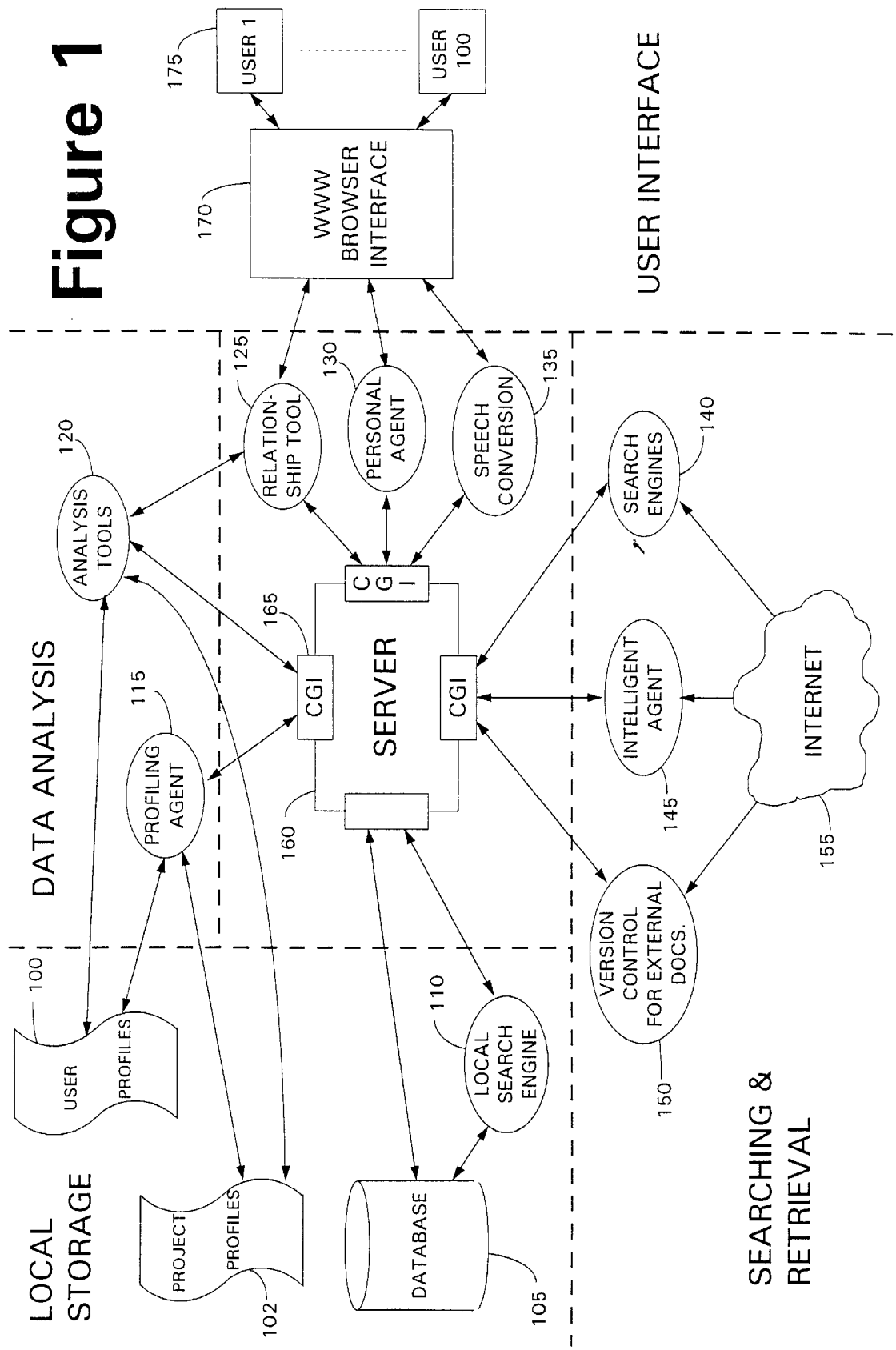
FIG. 1 is a diagram showing the main components of an information management system (IMS) according to a preferred embodiment of the invention.

The functionality of a number of Information Management System (IMS) components may preferably be provided by means of a software agent, known as "JASPER", described in the Applicant's co-pending Patent Application Number WO96/23265. References to JASPER will be made when describing the functionality of a number of IMS components in the following description.

The organisation of information within preferred embodiments of the IMS is founded on the principle that all data items in IMS are objects in the object-oriented computing sense, and that every object has a "profile". A profile may be a meta-data summary of the content of the respective object, or a profile may comprise a simple list of keywords. A profile may include information to enable the object to be retrieved and for its relevance to a particular topic of consideration to be assessed within the IMS. Preferably, within the IMS, profiles are created by means of functionality described in the Applicant's co-pending JASPER patent application.

Certain types of object within the IMS have particular properties.

A "document" is an ordinary object, a "document" representing either a textual document—eg. a WEB page, a text file or a word-processed document—or another multimedia-type object—eg. a video recording, a picture or a sound file.

A project is a project object. A "project" is an object in very much the same way as an ordinary object with the addition that users may work on a project and modify it.

A user may also be considered an object within the IMS in much the same way as a project. A user's interests are represented by a user profile that may be modified either manually by the user or automatically by the IMS. Links may be established or suggested between user objects and any other objects stored within the IMS.

Referring to FIG. 1, an embodiment of an Information Management System (IMS) is shown divided into five functional parts:

SERVER
LOCAL STORAGE
USER INTERFACE
DATA ANALYSIS
SEARCHING & RETRIEVAL.

At the heart of the IMS is a Server 160 arranged to control information flow between components of each of the functional parts, for example to receive requests for information and to launch one or more components in order to generate a response to such requests.

Within the LOCAL STORAGE functional part of the system, the server 160 is connected to a Database component 105, comprising a store for an IMS Database, and to a Local Search Engine 110 for use in searching the IMS database 105 according to requirements for local information retrieval of the server 160. Also included within the LOCAL STORAGE are User Profiles 100 and Project Profiles 102, as will be described below.

Within the SEARCHING & RETRIEVAL functional part of the system—the principal means of access to external sources of information for the IMS—is provided a series of components, each connected to the Internet 155 to assist with searching and retrieval of information according to requirements of the connected server 160. In particular, an "intelligent" agent or other software agent 145 and search engines 140 may be provided to search and to retrieve information from the Internet 155 in response to specific requests by the server 160. In addition, a component 150 may be provided to assist with version control of externally retrieved documents. The server 160 interfaces to the agent components 140 and 145 and the version control means 150, by way of a Common Gateway Interface (CGI) 165. CGI interfaces are known in the art, for example from books listed on the Internet at Universal Resource Locator (URL) http://www.boutell.com/faq/books.htm Within the DATA ANALYSIS functional part of the system, one or more Profiling Agents 115 and Data Analysis Tools 120 are provided, each connected to the server 160 via a CGI 165. Physical or logical connections may also be provided between the profiling agents 115 and the LOCAL STORAGE for project 102 and user 100 profiles. Physical or logical connections may also be provided between the analysis tools 120 and a number of other IMS components, including the storage 100 and 102 and a Relationship Tool 125.

Within the SERVER functional part itself, the server 160 is connected, via a Common Gateway Interface (CGI) 165, to components designed to support the USER INTERFACE functional part of the system. In particular, the server 160 is connected to the Relationship Tool 125 to provide the principal means for the graphical visualisation of information at the user interface. The server 160 may also be connected to a Speech Conversion component 135 so that certain pieces of information may be made available from the server 160 to the USER INTERFACE as spoken messages. In addition, the server 160 may be connected to a Personal Agent component 130, arranged to monitor user input received from the USER INTERFACE, to supply user input to other components of the IMS via the server 160, and to provide information to the USER INTERFACE in response to actions triggered within the IMS by user input.

The USER INTERFACE functional part provides an interface to each of a number of Users 175 by means of a World Wide Web (WWW) Browser Interface 170. The browser interface 170 is connected to the relationship tool 125, in particular to enable output from the relationship tool to be displayed graphically to users of the IMS, to the personal agent component 130 and to the speech conversion component 135.

The operation and functionality of each of the components of the IMS shown in FIG. 1 will now be described in more detail.

Server

The Server 160 provides the principal controlling means within the IMS, linking the functionality of each of the participating component parts together, controlling information flows between components and launching components to obtain information or process information as necessary. In particular, the server 160 may make CGI calls to appropriate components in response to input received from other components of the IMS, and may supply resulting output from one component to another. In its simplest implementation, the server 160 may perform the role of a gateway between components of the IMS, the principal functionality of the system being embodied in those components. However, more system-specific functionality may alternatively be implemented within the server component itself. For example, some aspects of data analysis performed by the analysis tools 120 may be incorporated within the server 160. The server 160 is intended to hide from users the particular implementation of IMS components and the intercommunication required between those components to achieve particular functionality.

Search Engines

Search engines may be provided to carry out searches for externally stored information—search engine 140—or for information stored internally within the IMS database 105—local search engine 110. Local search engine 110 may be arranged to operate in real time in response to user input conveyed by the browser interface 170, through continuous communication with the personal agent 130, for example when a user enters a new topic description. A local search of the IMS. database may reveal stored references to data objects of relevance to the user. input, including stored references that may have been established by other users of the IMS in relation to the same or other topics. Data objects identified by the local search engine 110 may be listed on a display by the browser interface 170 via the personal agent 130, or displayed graphically by the relationship tool 125. Similarly, search engines 140 may search the Internet 155 for relevant documents over a longer period, using for example a search profile constructed by the profiling agent 115 of a user-entered document or topic description. The results of the external search may be displayed by the relationship tool 125, including information derived from the search results by the analysis tools 120.

A user may limit the extent to which a search engine 110, 140 will search, for example by specifying a "radius" of interest.

Various search engines are known for use in searching the Internet 155, for example "YAHOO". "PROSEARCH" may be used, the functionality of which is described in the Applicant's JASPER co-pending patent application referenced above.

Analysis Tools

Analysis Tools 120 may be provided, connected to the server 160, to receive results of information searches by searching engines 110 and 140, or intelligent agent 145 for example, and to derive further information from those results, drawing on information stored in the IMS database and from profiles relating to users and/or to projects. Preferably, the analysis tools may be arranged to assess the strength of an association between an object, represented for example by a project profile 102 or user profile 100, and a data object returned by a searching engine. The returned data object may itself be represented by a data object profile created by the profiling agent 115. The analysis result, expressed as a relevance score relating to strength of association, may be used by the relationship tool 125 to indicate, graphically, the strength of an association between objects returned by a search, for example by varying the thickness or length of a line connecting a pair of representative node icons on the display.

Relationship Tool

Data objects are often related. They have things in common with other data objects, for example two text documents may share a common set of keywords. Tools, such as JASPER, exist which can find these relationships, but it is often difficult to present these relationships to the user in a way that is both clear and yet not restrictive. Known methods of presenting relationships may also fail to offer a personalised view to each user.

The totality of information available to the SEARCHING & RETRIEVAL functional part of the IMS may be looked upon as a huge network (or graph) of connected objects, with relationships between them. The aim of the Relationship Tool 125 is to present to a user 175 via the browser interface 170, in a clear way, the small subset of the objects that the user actually needs to see and to allow the user to view, at a glance, the relationships between data. The relationship tool 125 is intended to provide neither proofs nor deductions; simply to help the user to see relevant information, presented in particular as a multi-way mapping between relevant objects known within the IMS.

The principal functions of the relationship tool 125 are as follows:

To display within a window, via the browser interface 170, a graph of connected nodes. A node represents a data object in the IMS, as may have been suggested by an IMS agent such as an "intelligent" agent 145 or a search engine 140 or 110. A different icon may be displayed at each node to indicate the type of the data object represented by the node on the graph.

To display data objects in such a way as to allow the user to be able to see relationships between them. Preferably, the strength of the relationship between a pair of data objects may be represented on the graph by varying the width or the length of a line connecting the respective node icons.

Preferably, in one view of data relationships, a project or a use profile may be represented as a centrally positioned node, surrounded by linked nodes representing data objects associated with the central project or user profile.

Data represented by a displayed node icon may be retrieved easily, for example by clicking on the node icon. If appropriate, the relationship tool 125 may obtain, via the server 160, a data object summary provided by a document summarising software agent, such as PROSUM, and display that summary within a text window after a user clicks on the respective icon shown within the graphical display window.

A user may establish manual links with suggested data objects shown on a graph, in acceptance of associations suggested automatically by IMS agents such as the "intelligent agent" 145 or search engines 140 and 110 via the analysis tools 120. A manually created or accepted link between data objects is communicated by the relationship tool 125 to the LOCAL STORAGE functional unit for storage in the IMS database 105, via the server 160. A collection of manually associated objects may constitute a virtual case file for a project and may be to some extent user-specific.

The user may specify how much of the information suggested by IMS agents will be presented on the screen, by "pruning", that is by specifying the minimum strength of an association between data objects required to qualify for display on the graph.

The user may traverse the graph of related data objects at will.

The relationship tool 125 may interface to IMS agents such as the profiling agent 115 and the analysis tools 120 (preferably JASPER), via the server 160, and to the personal agent 130 to provide data entered by a user for use in searching. Searching data may include a profile of a user-entered document, created by the profiling agent 115, or a profile of a document retrieved by a search agent 110, 140.

The graph may be displayed within a frame of a JAVA-enabled web browser and the relationship tool itself may be implemented as a JAVA applet.

When data is being entered (e.g. for a new project description) the relationship tool 125 may continually communicate with search agents 110, 140 and present retrieved documents that are similar to (or related to) the data being entered.

When the user enters a new project, the relationship tool 125 will produce a frame on the screen with one centrally positioned node representing the current project.

Nodes appear on the graph, each representing the documents returned by the search agents 110, 140.

The user can click on a node to see the associated document.

If the user determines that the suggested document was truly relevant, then the node may be manually linked to the project. This manually accepted link is displayed as a thicker line.

An algorithm may be implemented by the relationship tool 125 to generate a graphical representation of data objects and the relationships between them based upon a list of keywords supplied, for example, by the user or derived by the profiling agent 115. The relationship tool 125 may provide access to the following to enable the graph building algorithm to operate:

(1) a Priority Queue to store references returned by a searching agent 110 or 140, to be arranged in order of strength of relevance to the search;

(2) a Graph Data Structure within which to represent objects and their interrelationship; and (3) Search agent interfaces.

The relationship tool 125 may implement an algorithm to take user-entered keywords and to present relevant information retrieved by the IMS search agents 140, 110, including the following procedural steps:

Procedure Search (keywords):
    Create an empty graph and place a node representing the search in the centre of the graph;
    Activate Search agents based on keywords provided by a user; Prune the agent results (ignoring anything assessed by the analysis tools 120 as being of low relevance to the search) and store the agent result node references in the Priority Queue; Put each search result on the graph as a node connected to the centre node by a line of length inversely proportional to the relevance of the node (the shorter the line, the more relevant);
End Search
While more nodes in the Priority Queue:
    Get the highest priority node from the priority queue and remove it;
    Mark the node as visited;
    Get the keywords of the selected node;
    Keep only the most relevant keywords;
    Activate search agents based on these keywords;
    Prune the results (ignore anything with low relevance ratings);
    Add additional resultant nodes to the graph with connecting lines of length inversely proportional to the relevance;
End While With reference to FIG. 2, an example of a graph is shown as may be produced by the algorithm described above. In the example shown in FIG. 2, the search topic represented by a centrally placed node 200. The Search Procedure returns a pruned list of data items to be represented by nodes of relevance to the central search topic 200, for example "DOC 1" represented by node 205, connected to the central search node 200 by a relatively long line indicative of lower relevance, and "DOC 5" represented by node 210, connected to the search node 200 by a short line, indicating higher relevance.

The "While" loop in the above algorithm may then further analyse the node of highest relevance, node 210, taking only the most relevant keywords contained in a profile of the node to perform a further more specialised search. This further search may result in two additional nodes on the graph, nodes 215 and 220, linked to the node 210.

Personal Agent

A personal agent 130 may be included in the IMS, connected to the server 160 via a CGI 165, and to the browser interface 170. An example of a Personal Agent is a "Remembrance Agent" as described in "Remembrance Agent: A Continuously Running Automated Information Retrieval System" by Bradley J. Rhodes and Thad Stanner, published in the proceedings of the First International Conference on the Practical Application of Intelligent Agents and Multi-agent Technology, referenced above.

The personal agent 130 may be arranged to continuously monitor user input from the USER INTERFACE and to initiate searches for related information in real time, presenting the results of such searches to the use via the browser interface 170. For example, a user may register a topic of interest with the IMS, defining the topic by means of a description or series of keywords entered at within the browser interface 170. The personal agent 130 may, for example, capture keywords as they are typed by the user, and submit them one by one to a local search engine 110, via the server 160. If the local search engine finds relevant data objects referenced within the IMS database 105, then they may be presented to the user via the browser interface 170 by the personal agent 130, or displayed graphically by the relationship tool 125.

Speech Conversion

A speech conversion component 135 may be included, employing speech synthesis technology such as that provided by the "LAUREATE" product by the present applicants, to provide, if appropriate, a speech representation of data objects presented at the user interface. For example, a speech summary of a document may be provided to a user after clicking on the respective node icon displayed by the relationship tool 125. Alternatively, a sequence of speech representations of documents found as a result of an overnight search may be provided to a user automatically after login to the IMS.

Profiling Agent

All objects in the IMS may have a profile. A profiling agent 115 may be included in the IMS to create object profiles for various types of object. For example, a document may be presented to the profiling agent 115 to create a document profile comprising meta-data representing the document. The meta-data document profile may be stored in the IMS database 105 via the server 160. Preferably, the JASPER product is used to implement the functionality of the profiling agent 115 in the IMS. If necessary, a document may be converted, for example at the server 160 CGI interface, to a Web page format before being presented to JASPER for profiling.

Documents presented to the profiling agent 115 may originate from a variety of sources in the IMS and the profiling result may be used for a variety of purposes. For example, a user-entered document or project description may be submitted for profiling by way of the browser interface 170 and the server 160. The project may be created by the server as a CGI script which generates an HTML document, based upon the project description, for submission to the profiling agent 115. The resulting profile may be stored by the profiling agent 115 in the LOCAL STORAGE as a project profile 102 for use in searching for related data objects by the searching engines 110 and 140, or used by "intelligent" agents 145. Data objects returned by internal or external searching may similarly be profiled by the profiling agent 115 for storage in the IMS database 105 or inclusion in a project profile 102 or user profile 100. Data object profiles also provide a convenient basis from which the analysis tools 120 may derive further information of interest to users of the IMS.

Project profiles may be enhanced at any time by the user owning the project through manual addition or amendment of keywords.

USE OF THE SYSTEM

Referring to FIG. 1, embodiments of the present invention might be used as follows.

A set of users, for instance employees in a corporate environment or police and their associates, have access to the system via personal computers or other suitable terminals 175. Each user is registered in the system in a known manner by use of a WorldWide Web browser interface 170 to a Web server 160. In order to register, the user provides at least a minimum set of information about themselves, the minimum set including for instance identification (name and contact details) and a set of keywords representing the user's particular interests. The minimum set of information is stored, under control of a control process running at the server 160, in the system database 105.

Between the browser interface 170 and the system server 160, there are provided an array of tools 125, 130, 135. One of these tools, for instance the personal agent 130, may provide functionality for interfacing with the user to obtain the minimum set of information. (This type of functionality is known and not therefore further described herein.)

The set of keywords provided by the user is then supplied to each component of the system which requires it. This might include for instance the profiling agent 115, the intelligent agent 145, the personal agent 130, the relationship tool 125 and the analysis tools 120.

Because the system includes the functionality of known searching tools, once the user has registered, these tools will start to run in respect of the set of keywords it receives. Hence the personal agent 130 may start to monitor existing entries in the system database 105, via the local search engine 110, and ongoing inputs and/or communications by other users, as soon as the user profile has been supplied to it.

As well as the personal agent 130, there are further-search capabilities to which the user profile is supplied which work over a longer period and therefore report to the user after a fixed time interval or at the next logon by that user. This applies to the profiling agent 115 and to the intelligent agent 145 having access to the Internet.

The profiling agent 115 has the searching functionality of the JASPER agent mentioned above and described in International Patent Application WO 96/23265. The JASPER agent stores profiles, or meta information, in respect of documents selected by other users. For each user, it monitors the profiles being input, using the user profile to screen them. If a profile being input would be of interest to the user, it notifies the user. Hence JASPER creates its own database of profiles relating to documents or other objects which are of interest to a closed user group.

JASPER uses the user profile to sort meta-information relating to objects that would be of interest to a user in a sophisticated way. That is, it uses clustering techniques to sort user keyword sets into subsets for a user. It can also use clustering to extend the scope of a retrieval exercise to include profiles (or meta-information) relating to objects or documents which are clearly closely related to documents being located by means of the profile but which the profile itself does not directly identify. Documents identified in this way may be presented to a user by means of a "What's New" page at the user interface.

The intelligent agent 145 has the same functionality in terms of clustering for search purposes. The difference between the JASPER functionality mentioned above, and that of the intelligent agent 145 accessing the Internet 155 in the present invention is simply the search space involved. Instead of being limited to profiles relating to documents already selected by users and therefore loaded to the JASPER database, the intelligent agent 145 uses. the user profiles to search the Internet itself.

The intelligent agent 145 may also use clustering techniques to cluster a user's keyword set to create subsets, relating to different interests. These subsets it may feed to conventional search engines, such as the known "YAHOO" engine, to return results more focussed on a search topic within the user's interests.

The system of the present invention presents results to the user using the clustering techniques described in WO 96/23265. The clustering technique is used to identify related objects and to give a measure of the strength of the relationship. The measure of the strength of the relationship can be output as a "star rating" in relation to the link between each pair of objects, or at least between each object and a target object. It can use the relationship tool 125 to generate a set of links between the objects and to use the star rating to determine how (or whether) a set of links is shown. For instance, only the strongest links may be shown, or only first and second layers.

A particularly important aspect of embodiments of the present invention is the capability of managing information between users in a manner determined by project profiles. A project profile is created by the profiling tool 115, using the JASPER functionality, from a description entered by a user. The description may be a project description document of the type that might be generated by a corporate entity, or might simply be a few words or pieces of data describing a scenario. The profiling tool generates a project profile which might for instance include the loading date in respect of loading it to the system, the identifier for the user (who will be registered as the project owner), and then keywords characterising the project.

The project profile is loaded to the system database 105. It is also loaded to the various search engines of the system in the same way as the user profile described above. Consequently, the various search engines will run the same categories of search, in relation to the project profile, and will therefore report in the same manner, via the browser 170.

Search results using the JASPER clustering capability will have an associated star rating applied to the strength of links between objects. This star rating is applied by the relationship tool in the manner described below, by building a graph having different levels of link strengths shown.

The graph is presented to the owner of the project who can select the links which are to be accepted or create links between objects if appropriate. If the owner accepts links, the objects connected by the links are loaded to the system database 105 as a virtual case file for that owner and project. Objects connected by links which the owner does not accept are discarded with respect to that owner. If two projects are deemed to be similar and a link is established between them, then any information linked to one project may be associated indirectly with the other project.

As mentioned above, other users may request to be assigned to a project, or may be assigned by the owner. The system maintains a register of assignment in this way. If one of the assigned users wishes to be shown results of a search relating to a project, they may either be shown the virtual case file selected by the owner or they may be shown the results of a fresh search and enabled to create their own virtual case file. This means that a project profile can actually be tailored to the interest of respective users.

For instance, in the context of a crime, police officers might be interested in the timing and circumstances. A forensic expert might be more interested in the status and availability of evidence. Hence it would be very useful if the forensic expert were able to create a virtual case file independently of the selection made by the owner of a project ("case"), if the owner is a police officer and therefore has different interests.

The following table is included for completeness to show the detail of a preferred relational database implementation of the IMS LOCAL STORAGE by means of a list of SQL calls to tables within that database.

SQL Calls to the IMS Database

| No | Action | SQL/Perl |
|---|---|---|
| 1 | Checks User details for logging on | SELECT *FROM Users WHERE LoginName = user' AND Password = '$pwd' |
| 2 | Create a New User | INSERT INTO Users (Password, LoginName, FullName, Role, Location, Telephone, Email, Whereabouts, PhotoID) VALUES ($pwd, $loginname, $fullname, $role, $location, $tel, $email, $where, $photo) |
| 3 | Delete a User | SELECT OwnerID FROM Users WHERE UserID = '$userid'; $db -> Sql($Sql); $db -> FetchRow; $OwnerID = $db -> Data ('OwnedID'); DELETE FROM Users WHERE OwnerID = '$ownerid'; |
| 4 | Create a User's Profile | SELECT UserID FROM Users WHERE Detaiis = '$details'; $db -> Sql($Sql); $db -> FetchRow; $userid = $db -> Data ('UserID'); INSERT INTO Profiles (UserID, Keyword) VALUES ($userid, $keyword); |
| 5 | Adding a keyword to a User's Profile | INSERT INTO Profiles (OwnerID, Keyword) VALUES ($ownerid, $keyword); |
| 6 | Removing a keyword from a User's Profile | DELETE FROM Profiles WHERE Keyword = '$keyword' AND OwnerID = '$ownerid'; |
| 7 | Create a New. Project | INSERT INTO Projects (Title, Datestamp, OwnerID, Location, Workers, Details) VALUES ($tide, $date, $ownerid, $location, $ workers, $details) |
| 8 | Create a Project Profile | SELECT ProjectID FROM Projects WHERE Details = '$details' $db -> Sql($Sql): $db -> FetchRow; $userid = $db -> Data ('ProjectID'); INSERT INTO Projprof (ProjectID, Keyword) VALUES ($projectid, $keyword); |

-continued

| No | Action | SQL/Perl |
|----|--------|----------|
| 9 | Adding a keyword to a Project's Profile | INSERT INTO Projprof (ProjectID, Keyword) VALUES ($projectid, $keyword); |
| 10 | Removing a keyword from a Project's Profile | DELETE FROM Projprof WHERE Keyword = '$keyword'; |
| 11 | Adding a new Object | INSERT INTO Objects (Title, Annotation, Type, ProjectID, Location) VALUES ($tide, $annotation, $type, $projectid, $location); |
| 12 | Deleting a Object | DELETE FROM Objects WHERE Title = '$title'; |
| 13 | Adding a Link to an Object | INSERT INTO Links (ObjectID, Object2ID) VALUES ($objectid, $object2id); |
| 14 | Search Project Profiles and count the number of times a list of keywords appear in each Project. | SELECT Projprof.ProjectID, Projects.Title, Count(Projects.Title) AS [Count Of Title] FROM Projects INNER JOIN Projprof ON Projects. ProjectID = Projprof ProjectID WHERE (((Projprof.Keyword) = '$keyword1' OR (Projprof.Keyword) = '$keyword2' OR (Projprof.Keyword) = '$keyword3')) GROUP BY Projprof.ProjectID, Projects.Title; |
| 15 | Find out what Projects a User is currently working on. | SELECT Projects.Title, Workers.OwnerID FROM Projects INNER JOIN Workers ON Projects.ProjectID = Workers.ProjectID WHERE (((Workers.OwnerID) = '$ownerid')); |
| 16 | Creating a virtual Case File. | SELECT Objects.ObjectID,Objects.Title, Objects.Location FROM Objects INNER JOIN ProjLinks ON Objects.ObjectID = Projlinks.ObjectID WHERE (((ProjLinks.ProjectID) = '$projectid')); |
| 17 | Show which Project User is currently working on | INSERT INTO linkstatus (ProjectID, UserID, url, Title) VALUES (−1, $userid, $url, $title); |
| 18 | Change to Project a User is working on. | UPDATE linkstatus SET url = '$url',Title = '$title' WHERE usefid = '$userid'; |
| 19 | Find out what Project a User is curently working on. | SELECT * FROM linkstatus WHERE Userid = '$useid'; |
| 20 | Publish a new object | INSERT INTO Objects (Title, OwnerID, Location) VALUES ($title, $userID, $objurl); |
| 21 | Remove an Object | DELETE FROM Objects WHERE Objectid = '$objectid'; |
| 22 | Associate an Object with a Project. | INSERT INTO ProjLinks (ProjectID, ObjectID) VALUES ($projid,$obiectid); |
| 23 | Change the User's preferences | UPDATE Users SET "$__."="".$query ->param($__)."" WHERE Loginname = '$user'"; |

What is claimed is:

1. An information management system for a plurality of users, the system comprising:

i) at least one user interface for receiving user input information;

ii) data storage means;

iii) a data input tool for generating an information profile from user input information received at the user interface, and for storing said information profile in the data storage means;

iv) means for generating and storing user profiles, each user profile comprising at least one keyword allocated to a respective user;

v) at least one data retrieval tool for locating information in accordance with an information profile generated by the data input tool, for storing data relating to information so located, and for searching data so stored in accordance with at least one user profile; and vi) control means for receiving said user inputs and for running one or more of said tools wherein the control means are arranged, in use, to receive said user input information, to run the data input tool to generate and store an information profile from said user input information, and to input said information profile to the data retrieval tool to locate information in accordance with said information profile.

2. An information management system according to claim 1 wherein the control means further comprise means to log user identity information against an information profile generated from information input by that user.

3. An information management system according to claim 1 wherein the control means are arranged to give access to said information profile and/or information thereby located, only to the user providing said user input information.

4. An information management system according to claim 1 wherein the control means give access to additional users, but not the capability to modify said information profile and/or information thereby located.

5. An information management system according to claim 1 wherein the control means are arranged to maintain, under the control of an owner of an information profile, a register of identifiers for other users having access to information located in accordance with the information profile, the owner having unique control over the contents of the register.

6. An information management system according to claim 1 further comprising user selection means for selecting results output by the data retrieval tool in accordance with a respective user profile, the selected results being persistently stored.

7. An information management system according to claim 6 wherein the selected results are persistently stored in relation to the respective user, and/or persistently stored in relation to an information profile used by the data retrieval tool to locate the results.

8. An information management system according to claim 1 wherein the data retrieval tool includes means for calculating a measure of relevance for information located in accordance with an information profile and for outputting said measure of relevance when reporting information so located.

9. An information management system according to claim 8 wherein said measure of relevance is applied in a discrete rather than a continuous way such that it can be used to separate search results into two or more sets, the first set being strongly relevant to a request and the second layer being weakly relevant to the request.

* * * * *